United States Patent [19]

Allum et al.

[11] 3,832,404
[45] Aug. 27, 1974

[54] HYDROFORMYLATION PROCESS

[75] Inventors: Keith George Allum, Bracknell;
Ronald David Hancock, Weybridge;
Samuel McKenzie, Richmond;
Robert Chalmers Pitkethl,
Camberley, all of England

[73] Assignee: The British Petroleum Company,
London, England

[22] Filed: Dec. 14, 1970

[21] Appl. No.: 98,030

[30] Foreign Application Priority Data
Dec. 19, 1969  Great Britain............... 61920/69
Sept. 30, 1970  Great Britain............... 46614/70
Nov. 20, 1970  Great Britain............... 56219/70

[52] U.S. Cl.... 260/604 HF, 252/431 P, 260/429 R,
260/439 R, 260/448.8 AS, 260/638 HF, 260/683.9
[51] Int. Cl... C07c 27/22, C07c 29/16, C07c 47/02
[58] Field of Search............ 260/604 HF, 638 HF

[56] References Cited
UNITED STATES PATENTS
3,487,112  12/1969  Paulik et al................ 260/604 HF
3,578,609  5/1971  Haag et al.................. 260/604 R

OTHER PUBLICATIONS

Webster et al., Platinum Metal Review, Vol. 13, pages 104–110, July 1969.
Hershman et al., I & E. C. Product Research and Development, Vol. 8, pages 372–375, December 1969.

*Primary Examiner*—Joseph E. Evans
*Attorney, Agent, or Firm*—Morgan, Finnegan, Durham & Pine

[57] ABSTRACT

A heterogeneous hydroformylation process in which an olefin is reacted with CO and $H_2$ is effected in the presence of a catalyst containing units of formula

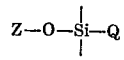

where Z is a residue obtained by removing an —OH group from a solid inorganic material containing —OH groups, e.g., silica and Q is a group containing phosphorus bonded to a transition metal, e.g., rhodium or cobalt.

7 Claims, No Drawings

HYDROFORMYLATION PROCESS

The present invention relates to catalysis, more particularly to a hydroformylation process using a solid heterogeneous catalyst. The use of phosphorus - containing complexes of transition metals as homogeneous catalyst for a variety of reactions such as carboxylation, hydrogenation and oligomerisation of olefins has been described. The catalysts often contain valuable metals, for example, palladium and iridium and catalyst recovery and recycle is therefore important. However, it is often a problem to achieve a high degree of catalyst recovery.

U.K. Pat. application No. 61920/69 describes the preparation of a catalyst support containing groups of the formula:

  (I)

where Z is a residue obtained by removing an —OH group from a solid inorganic material containing —OH groups and Q is a group containing trivalent phosphorus. The specification further describes the preparation of solid materials suitable for use in heterogeneous catalysis containing transition metals bonded to the phosphorus, and a number of different catalytic applications of these materials are described, e.g., their use as heterogeneous catalysts for the hydroformylation of olefins.

According to the present invention a heterogeneous process for the hydroformylation of olefins to alcohols, aldehydes or both comprises hydroformylating an olefin with carbon monoxide and hydrogen at a temperature of from 20° to 250°C in the presence of a solid catalyst of formula:

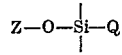

where Z is a residue obtained by removing an —OH group from a solid inorganic material containing —OH groups and Q is a group containing phosphorus bonded to a metal selected from rhodium, cobalt and iridium.

The catalysts for use in the present invention can be prepared by (i) reacting a transition metal compound with a compound containing silicon and phosphorus e.g. $(EtO)_3 Si(CH_2)_2 PR_2$ to form a compound containing transition metal bonded to phosphorus and reacting this latter compound with an inorganic solid containing —OH groups or (ii) reacting the inorganic solid with the compound containing silicon and phosphorus and then reacting this product with the transition metal compound.

Both methods are described in our U.K. Pat. application No. 61920/69.

Preferably the inorganic solid material containing —OH groups is silica.

Preferably the catalyst has the formula:

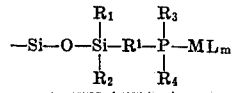

where $R_1$ and $R_2$ are alkyl, aryl, alkoxy or aryloxy containing up to 10 carbon atoms and $R_3$ and $R_4$ are aryl or alkyl groups containing up to 10 carbon atoms, —$R^1$— is an alkylene or arylene (which can be substituted) containing up to 24 carbon atoms, M is a metal selected from iridium, rhodium and cobalt, L is a ligand and m is a number such that the free valencies of the metal are satisfied.

Preferably the $R^1$ group is (—$CH_2$—)n where $n$ is an integer from 1 to 6

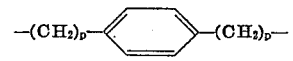

or

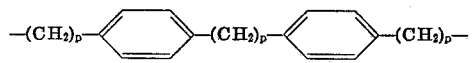

where $p$ is an integer from 0 to 6.

Preferably the transition metal is rhodium.

Suitable olefins for the present invention are those containing two to 20 carbon atoms per molecule and particularly ethylene, propylene, hexenes, heptenes e.g. ethyl pentenes, octenes and nonenes.

The hydroformylation can be effected at pressures from 0 to 25,000 $KN/m^2$ ga, preferably 1,400 to 15,000 $KN/m^2$ ga.

Preferred temperatures are from 200°C.

Preferred space velocities are in olefin LHSV of from 0.1 to 20 and a GHSV of hydrogen and carbon monoxide of 50 to 10,000. The GHSV is expressed as volumes of liquid or gas per vol. of catalyst.

It has been found that some of the catalysts are oxygen sensitive in that oxygen can cause elution of metal and hence loss of activity. The oxygen sensitivity has been found to depend on the nature of the particular catalyst used and also the temperature and space velocity. For example in the case where the catalyst contains rhodium bonded to only one phosphorus atom it has been found that oxygen can cause elution of the rhodium. It may therefore desirable to reduce the oxygen content of the feed to a low level. Desirably the oxygen content of the combined carbon monoxide and hydrogen feed is maintained below 300 ppm. Preferably, when operating at temperatures above 70°C and space velocity above 1 LHSV or 500 GHSV the oxygen content of the feed is maintained below 30 ppm.

The molar ratio of hydrogen to carbon monoxide in the feed can be from 10:1 to 1:10. The preferred ratios are 2:1, which encourages alcohol formation and 1:1 which encourages aldehyde formation. The olefin can be introduced in a solvent. Any suitable inert organic compound such as a saturated or aromatic hydrocarbon or an alcohol can be used. Normal paraffins such as n-hexane, n-heptane and n-octane are suitable.

The invention is illustrated by the following Examples.

EXAMPLE 1

(i) The preparation of Silica Containing Trivalent Phosphorus

All preparations of the silica bonded catalysts were carried out under oxygen-free nitrogen using dry, degassed solvent. The silica used through-out was J. Crosfield U40 grade which had been washed with dilute acid, soxhlet-extracted with distilled water and then dried for 4 hours at 180°C.

a. Preparation of $(C_2H_5O)_3Si\ CH_2\ CH_2\ P(C_6H_5)_2$ (P)

Triethoxy vinyl silane (69.6 g, 0.36 mol) was added under nitrogen to stirred diphenyl phosphine (80.4 g, 0.42 mol) dropwise over 30 minutes. The mixture was then irradiated with a high intensity ultra-violet lamp for 70 hours. The reaction product was distilled and the fraction distilling at 155° – 165°C and 0.1 mmHg collected (127 g, yield 85 percent).

Silica (ex J. Crosfield U40 grade) was washed with dilute acid and then with distilled water in a Soxhlet apparatus and dried for four hours at 180°C.

b. Reaction with the silica 60 g of the silica was treated with 60 g of compound (P) in 500 mls refluxing xylene for eight hours under nitrogen. Ethanol was azeotroped from the reaction mixture. The silica was subsequently washed with toluene in a Soxhlet apparatus for six hours under nitrogen and dried under vacuum.

Phosphorus content = 1.0 percent weight.

ii. Preparation of the rhodium-containing catalyst a. 10 g of product from (i) (b) above (containing 1 percent weight phosphorus) were treated with 2.1 g of $Rh(CO)_2$ (acac)(where acac is the acetyl acetone anion) in 50 mls of toluene for 15 minutes at 50°C. The product was washed with toluene and pentane and dried under vacuum. A yellow product resulted.

Rhodium content = 2.2. percent weight.

iii. Hydroformylation of Hexene-1

A litre rocking autoclave was charged with hexene-1 (100 ml), n-heptane (200 ml) and catalyst (0.2 g) prepared as described in part (ii) (a) above and heated at 80°C for 3 hours under 4100 kN/m² (ga) of ($CO/H_2$ (1:1). The bomb was repressurized to 4100 kN/m² (ga) at 1 hourly intervals. The autoclave was allowed to cool over the weekend.

| | |
|---|---|
| Conversion | 100 percent weight |
| Molar Selectivity of $C_7$ Aldehydes | 30 percent weight |
| Normal: Branch ratio | 1.95 |

(70 per cent of the olefin is isomerized to internal olefin).

The result illustrates that rhodium-containing catalysts prepared by the second method referred to on page 3 (in which an inorganic solid containing —OH groups is reacted with a compound containing silicon and phosphorus to form a support, which is then reacted with a transition metal compound) are active hydroformylation catalysts.

EXAMPLE 2 i. Catalyst Preparation a. The compound $(C_2H_5O)_3 SiCH_2 CH_2P(C_6H_5)_2$ (A) was prepared from triethoxy vinyl silane and diphenyl phosphine as described in Example 1.

b. (i) 17.4 g of compound (A) dissolved in 10 ml of benzene were added to 3.8 g of cyclo-octadiene rhodium (I) chloride [$RhCl (C_8H_{12})$]$_2$ in 100 ml of benzene. The coloure of the solution changed from light orange to bright red. The solution was left stirring at room temperature for 16 hours under nitrogen. The benzene was then evacuated off to yield a red viscous material. The complex was dissolved in pentane and then precipitated from solution by cooling. The supernatant solution was decanted off and the remaining viscous material, evacuated at 60°C and $10^{-4}$ mmHg for 14 hours to yield compound (B).

6.03 g of the compound (B) were dissolved in 60 ml of benzene and the solution was added to 50 g of silica suspended in 150 ml of benzene under nitrogen. The reaction mixture was refluxed for 2 hours and the resulting ethanol azeotroped off using a Dean and Stark apparatus. After decanting the supernatant liquor the resulting red solid was washed with three 50 ml portions of benzene, dried and extracted with benzene for 10 h under nitrogen in a Soxhlet apparatus. The catalyst was then dried in vacuo.

| | |
|---|---|
| Rhodium content | 0.54% |
| Chlorine content | 0.3% wt |
| Phosphorus content | 0.6% wt | ii. Hydroformylation 20 mls of the catalyst prepared as described in (i) above were loaded into a pilot plant and used to hydrogenate olefins in steam cracked gasoline containing 100 p.p.m. added mercaptan sulphur (as n-butyl mercaptan) and 100 p.p.m. added thiophen sulphur (as thiophen).

After 71 HOS the liquid feedstock and hydrogen flows were stopped and the reactor allowed to cool down to room temperature under pressure of 690 kN/m² (ga) of $H_2$. Degassed benzene was passed over the catalyst to remove any residual steam-cracked gasoline. The reactor was purged with $CO/H_2$ (1:1). The temperature and pressure were then increased to 80°C and 4,100 kN/m² (ga) respectively and a 33 percent weight solution of hexene-1 in n-heptane (degassed before use) passed over the catalyst at LHSV of 3. The following results were obtained.

| HOS | Temperature °C | Pressure (kN/m² ga) | GHSV | Conversion to Aldehydes (% wt) | n:b ratio |
|---|---|---|---|---|---|
| 2–4 | 80 | 4100 | 1200 | 5 | 2.2 |
| 11–13 | 140 | 4100 | 1600 | 47 | 2.6 |

EXAMPLE 3

In Examples 3 onwards no precautions were taken to prevent air contacting the catalyst during loading or to deoxygenate the $CO/H_2$.

a. A silica-supported cobalt complex (cobalt content = 1.6 per cent weight) was prepared from [$Co_2 (CO)_6 ((EtO)_3 SiCH_2 CH_2 P (C_6H_5)_2)_2$] and silica.

Preparation of $(Co_2 (CO)_6( (EtO)_3SiCH_2 CH_2 PO_2)_2)$ 0.8 g freshly sublimed $Co_2 (CO)_8$ were placed in a flask in 20 ml degassed pentane and 1.9 g of $(EtO)_3$-$SiCH_2 CH_2 PO_2$ added under nitrogen. The reaction mixture was stirred at 0°C for 2–3 hours and then stood in an ice-box for 66 hours. The pentane was removed in vacuo to yield viscous brown material.

2.6 g of the complex [$Co_2 (CO)_6((EtO)_3$-$SiCH_2CH_2P(C_6H_5)_2)_2$] were dissolved in 175 ml of dry, degassed benzene under nitrogen in a 250 ml three-necked flask. 10 g of silica were then added and the reaction mixture refluxed with stirring for four hours. The ethanol was azeotroped from the reaction mixture by means of a Dean and Stark apparatus. The resulting silica containing bonded cobalt was soxhlet-extracted with benzene for 24 hours under nitrogen and then dried in vacuo.

cobalt content = 1.6% wt b. 0.368 g of the catalyst were placed in a 500 ml stainless steel stirred autoclave together 84 g of hexene-1 and 200 ml of n-heptane. The reaction mixture was then heated at 180°C for 4 hours at a pressures of 6,900 kN/m²(ga) $CO/H_2$ (1:1). The reaction vessel was cooled to room temperature.

| | |
|---|---|
| Conversion | 55.4 percent weight |
| Selectivity to aldehydes | 18 percent weight |
| Normal/branched aldehyde ratio | 1.2 |
| Selectivity to internal olefins | 82 percent weight |

The product contained less than 1 ppm coblat.

This results illustrates that the elution of the cobalt from the silica is negligible during the reaction, and that cobalt-containing catalyst prepared by the first method described on page 3 are active for hydroformylation.

EXAMPLE 4

Catalyst Preparation a. The compound $(C_2H_5O)_3 SiCH_2CH_2P(C_6H_5)_2$ (A) was prepared from triethoxy vinyl silane and diphenyl phosphine as described in our Example 1.

b. 3.67 g of the compound (B) prepared as described in Example 2(b) were dissolved in 30 ml of benzene and added to 20 g of silica and 50 ml of benzene. The reaction mixture was refluxed under nitrogen for two hours and the ethanol so produced azeotroped from the reaction mixture using a Dean and Stark apparatus. The benzene was decanted off from the silica and the resulting dark red silica washed with benzene (3 × 30 ml). The silica was then transferred under nitrogen to a Soxhlet apparatus and extracted with benzene for 10 hours (after which time the eluent was colourless). The silica was then dried in vacuo.

| | |
|---|---|
| rhodium content | 0.7 percent weight |
| phosphorus content | 0.6 percent weight | c. 1.411 g of the catalyst were placed in a 500 ml stainless steel stirred autoclave together with 84 g of hexene-1 and 200 ml of n-heptane. The reaction mixture was then heated at 140°C for 4 hours at a pressure of 4130 kN/m² (ga) $CO/H_2$ (1:1). The reaction vessel was cooled to room temperature.

| | |
|---|---|
| Conversion | 100 percent weight |
| Selectivity to aldehydes | 78 percent weight |
| Normal/branched aldehyde ratio | 0.6 |
| Selectivity to internal olefins | 22 percent weight |

This results illustrates that rhodium-containing catalysts prepared by the first method described on page 3 (in which the metal compound is first reacted with a compound containing silicon and phosphorus and then reacted with an inorganic solid containing — OH groups) are active for hydroformylation

EXAMPLE 5 a. A silica-supported rhodium complex (rhodium content = 0.9 percent weight) was prepared from the complex $[RhCl(CO)((EtO)_3SiCH_2CH_2P(C_6H_5)_2)_2]$ and silica. The complex was prepared as follows:

Preparation of the complex (RhCl (RhCl(CO)(-$(EtO)_3SiCH_2CH_2PO_22$) (I)

2.487 g (6.4 mM) of rhodium dicarbonyl chloride were dissolved in 100 ml benzene in a flask and 9.599 g (25.5 mM) of (2-diphenyl phosphino ethyl) triethoxyl silane $((EtO)_3SiCH_2CH_2PO_2)$ dissolved in 50 ml benzene added under nitrogen at room temperature. Carbon monoxide is evolved and the solution changes from red to yellow. The reaction mixture was stirred for 15 minutes with nitrogen passing through the solution and then stood overnight. The benzene was evaporated to small bulk and the product precipitated with pentane. The resulting yellow crystals were filtered off, washed with pentane and sucked dry.

| Analyses | Calculated | Found | |
|---|---|---|---|
| Rh | 11.19 | 11.11 | |
| C | 53.56 | 53.68, | 53.89 |
| H | 6.36 | 6.57, | 6.39 |
| P | 6.74 | 7.12, | 7.13 |
| Cl | 3.86 | 3.55, | 3.71 |
| $\nu$ (CO) = 1966 cm$^{-1}$ | | | |

5.5 g of the complex dissolved in 175 ml of toluene were placed in a 250 ml three-necked flasked under nitrogen. 20 g of silica were then added and the reaction mixture refluxed with stirring for four hours. The ethanol was azeotroped from the reaction mixture by means of a Dean and Stark apparatus. An orange/red product was formed. The resulting rhodium-containing silica was soxhlet-extracted with toluene under nitrogen for 24 hours and dried in vacuo.

| | |
|---|---|
| rhodium content | 0.9% wt |
| phosphorus content | 0.6% wt | b. 1.119 g of the catalyst were placed in a 500 ml stainless steel autoclave together with 84 g of hexene-1 and 200 ml of n-heptane. The reaction mixture was then heated at 140°C for 4 hours at a pressure of 4,130 kN/m² (ga) $CO/H_2$ (1:1). The reaction vessel was cooled to room temperature.

| | |
|---|---|
| Conversion | 100 percent weight |
| Selectivity to aldehydes | 56 percent weight |
| Normal/branched aldehydes ratio | 0.7 |
| Selectivity to internal olefins | 44 percent weight | c. The catalyst recovered from experiment (b) above was washed with acetone and dried in vacuo. The catalyst was stood in contact with air for 22 days. The reaction mixture was then heated at 140°C for 4 hours at a pressure of 4,130 kN/m² (ga) $CO/H_2$ (1:1). The reaction vessel was cooled to room temperature.

| | |
|---|---|
| Conversion | 100 percent weight |
| Selectivity to aldehydes | 76 percent weight |
| Normal/branched aldehydes ratio | 0.6 |
| Selectivity to internal olefins | 24 percent weight |

These results illustrate that the rhodium containing catalysts are resistant to air and moisture in that they substantially retain their activity. The selectivity to aldehydes increases while the normal to branched ratio falls off slightly.

EXAMPLE 6 a. A silica-supported rhodium complex (rhodium content = 1.2 percent weight) was prepared from the complex $[RhH(CO)((EtO)_3SiCH_2CH_2P(C_6H_5)_2)_3]$ Preparation of the complex $(RhH(CO)((EtO)_3SiCH_2CH_2PO_2)_3)$ 5 g of $(RhCl(CO)((EtO)_3SiCH_2CH_2PO_2)_2)$ and 8.3 g of $(EtO)_3SiCH_2CH_2PO_2$ were dissolved in 150 ml of refluxing ethanol and 2 g of sodium borohydride in 40 ml ethanol slowly added to the refluxing solution under nitrogen. A precipitate is slowly formed. After 2–3 hours, the solid was filtered off and washed with ethanol. The solid was then recrystallized from benzene/pentane and benzene/ethanol to yield an orange-yellow solid.

The infra-red spectrum shows absorptions at 1970 $cm^{-1}$ and 1900 $cm^{-1}$ assignable to the CO and Rh-H stretching frequencies.

4.5 g of the complex were dissolved in 175 ml of toluene in a 250 ml three-necked flask under nitrogen. 20 g of silica were then added and the reaction mixture refluxed with stirring for four hours. The ethanol was azeotroped from the reaction mixture by means of a Dean and Stark apparatus. A deep red product was formed. The resulting rhodium-containing silica was soxhlet-extracted with toluene for 24 hours under nitrogen and then dried in vacuo.

| | |
|---|---|
| rhodium content | 1.2% wt |
| phosphorus content | 1.15% wt | b. 0.888 g of the catalyst were placed in a 500 ml stainless steel autoclave together with 84 g hexene-1 and 200 ml n-heptane. The reaction mixture was then heated at 140°C for 4 hours at a pressure of 4,130 $kN/m^2$ (ga) $CO/H_2$ (1:1). The reaction vessel was then cooled to room temperature.

| | |
|---|---|
| Conversion | 100 percent weight |
| Selectivity to aldehydes | 50 percent weight |
| Normal/branched aldehydes ratio | 1.3 |
| Selectivity to internal olefins | 50 percent weight | c. The catalyst recovered from experiment Example 6 (b) above was washed with acetone and dried in vacuo. The catalyst was stood in contact with air for 10 days.

0.822 g of the recovered catalyst were placed in a 500 ml stainless steel autoclave together with 77.7 g of hexene-1 and 200 ml of n-heptane. The reaction mixture was then heated at 140°C for 4 hours at a pressure of 4,130 $kN/m^2$ (ga) $CO/H_2$ (1:1). The reaction vessel was then cooled to room temperature.

| | |
|---|---|
| Conversion | 100 percent weight |
| Selectivity to aldehydes | 59 percent weight |
| Normal/branched aldehydes ratio | 0.7 |
| Selectivity to internal olefins | 41 percent weight |
| The product contained less than 1 ppm rhodium | |

This result illustrates that rhodium-containing catalyst are resistant to air and moisture in that they substantially retain their activity. The selectivity to aldehydes increases slightly, whilst the normal to branched ratio fall off.

EXAMPLE 7 a. A silica-supported rhodium complex (rhodium content = 1.2 percent weight) was prepared from the complex $[Rh.SBu.(CO)((EtO)_3SiCH_2CH_2P(C_6H_5)_2)_2]$.

Preparation of the complex $(RhSBu^n(CO)((EtO)_3SiCH_2CH_2PO_2)_2)$ 0.899 g of $(Rh(CO)_2SBu^n)_2$ (prepared from $(Rh(CO)_2Cl)_2$ and nBuSH) and 50 ml of degassed pentane were placed in a flask and 4 g of $(EtO)_3SiCH_2CH_2PO_2$ added under nitrogen. Carbon monoxide is evolved. The reaction mixture was stirred for two hours at room temperature. Attempts to precipitate the reaction product with methanol were unsuccessful. The reaction mixture was therefore evaporated to dryness and the product redissolved in pentane. The solution was cooled to −78°C (a low melting solid is precipitated). The solution was allowed to warm to room temperature and the upper pentane layer discarded. The resulting red viscous liquid was reprecipitated from pentane in this manner three times and then dried in vacuo.

The infra-red spectrum shows a single CO stretching frequency at approximately 1950 $cm^{-1}$ (the starting material shows five CO stretching frequencies of which the two major bands are at approximately 2000 $cm^{-1}$ and 2050 $cm^{-1}$).

2.5 g of the complex $(RhSBu(CO)((EtO)_3SiCH_2CH_2PO_2)_2)$ were dissolved in 170 ml of benzene in a 250 ml three-necked flask under nitrogen. 10 g of silica were then added and the reaction mixture refluxed with stirring for four hours. The ethanol was azeotroped from the reaction mixture by means of a Dean and Stark apparatus. The resulting rhodium-containing silica was soxhlet-extracted with benzene for 24 hours and then dried in vacuo.

rhodium content = 1.2% wt b. 0.873 g of the catalyst were placed in a 500 ml stainless steel autoclave together with 84 g of hexene-1 and 200 ml of n-heptane. The reaction mixture was then heated at 140°C for 4 hours at a pressure of 4130 $kN/m^2$ (ga) $CO/H_2$ (1:1). The reaction vessel was cooled to room temperature.

| | |
|---|---|
| Conversion | 100 percent weight |
| Selectivity to aldehydes | 67 percent weight |
| Normal/branched aldehydes ratio | 0.6 |
| Selectivity to internal olefins | 33 percent weight |
| The product contained less than 2 ppm rhodium | | c. The catalyst recovered from Example 7 (b) was washed with acetone and dried in vacuo. The catalyst was stood in contact with air for 9 days.

0.437 g of the recovered catalyst were placed in a 500 ml stainless steel autoclave together with 42 g of hexene-1 and 100 ml of n-heptane. The reaction mixture was then heated at 140°C for 4 hours at a pressure of 4,130 kN/m² (ga) CO/H₂ (1:1). The reaction vessel was cooled to room temperature.

| | |
|---|---|
| Conversion | 100 percent weight |
| Selectivity to aldehydes | 63 percent weight |
| Normal/branched aldehydes ratio | 0.8 |
| Selectivity to internal olefins | 27 percent weight |

This result illustrates that rhodium containing catalysts in which the rhodium is bonded to sulphur are active for hydroformylation. It also shows that these catalysts are resistant to air and moisture.

EXAMPLE 8

1.25 g of the silica support were placed in a 500 ml stainless steel autoclave together with 84 g of hexene-1 and 200 mls of n-heptane. The reaction mixture was then heated at 140°C for 4 hours at 4,130 kN/m² (ga) CO/H₂ (1:1). The reaction vessel was cooled to room temperature. The product contained less than 2 per cent weight aldehydes although 44 per cent weight of the hexene-1 had been isomerised to internal isomers. When the reaction was repeated in the absence of silica virtually no hydroformylation or isomerisation occurred.

This result illustrates that the silica itself has little hydroformylation activity but substantial isomerisation activity. It also illustrates that the autoclave itself was not catalytically active for either hydroformylation or isomerisation.

Example 8 is included for comparative purposes only.

EXAMPLE 9

A silica-supported rhodium complex (rhodium content = 1.2 per cent wt) was prepared from [RhH(CO)(-(EtO)₃SiCH₂CH₂P(C₆H₅)₂)₃] and silica as described in Example 6 (a).

0.888 g of the catalyst were placed in a 500 ml stainless steel autoclave together with 84 g of hexene-1 and 200 ml of n-heptane. The reaction mixture was heated at 80°–83°C for four hours at a pressure of 4,130 kN/m² (ga) CO/H₂ (1:1). The reaction mixture was then cooled to room temperature.

| | |
|---|---|
| Conversion | 32 percent weight |
| Selectivity to aldehydes | 84 percent weight |
| internal olefins | 16 percent weight |
| normal/branched aldehyde ratio | 2.32 |
| The rhodium content of the product was less than 1 ppm | |

EXAMPLE 10

A silica-supported complex (rhodium content = 1.2 per cent wt) was prepared from [RhH(CO)((EtO)₃₋SiCH₂CH₂P(C₆H₅)₂)₃] and silica as described in Example 6(a).

0.888 g of the catalyst were placed in a 500 ml. stainless steel autoclave together with 84 g hexene-1 and 200 ml. n-heptane. The reaction mixture was then heated at 100°–101°C. for four hours at a pressure of 4,130 kN/m² (ga) CO/H₂ (1:1). The reaction vessel was then cooled to room temperature.

| | |
|---|---|
| Conversion | 67% wt |
| Selectivity to aldehydes | 64% wt |
| Selectivity to internal olefins | 36% wt |
| normal/branched aldehydes ratio | 2.75 |
| The rhodium content of the product was less than 1 ppm | |

We claim:

1. A heterogeneous process for the hydroformylation of 1-alkenes to alcohols, aldehydes or both which comprises hydroformylating said alkene with carbon monoxide and hydrogen at a temperature of from 20° to 250°C in the presence of a solid catalyst of the formula $$Z-O-\underset{\underset{R_2}{|}}{\overset{\overset{R_1}{|}}{Si}}-R'-\underset{\underset{R_4}{|}}{\overset{\overset{R_3}{|}}{P}}-ML_m$$

wherein Z is a residue obtained by removing an —OH group from silica, $R_1$ and $R_2$ are alkyl, aryl, alkoxy or aryloxy containing up to 10 carbon atoms, $R_3$ and $R_4$ are aryl or alkyl groups containing up to 10 carbon atoms, R' is alkylene or arylene containing up to 24 carbon atoms, M is rhodium, cobalt or iridium, L is acetyl acetone, carbonyl, chloro, cyclooctadiene, hydrogen or n-butylsulfide and m is a number such that the free valencies of the metal M are satisfied.

2. A heterogeneous process as claimed in claim 1 wherein —R¹— is (—CH₂—)ₙ where $n$ is an integer from 1 to 6 or

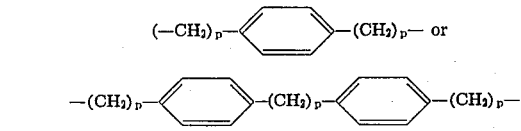

where $p$ is an integer from 0 to 6.

3. A process as claimed in claim 1 wherein the alkene is selected from ethylene, propylene, hexene or heptene 4. A process as claimed in claim 1 wherein the pressure is in the range 0 to 25,000 kN/m² (ga).

5. A process as claimed in claim 1 wherein the alkene has a LHSV of 0.1 to 20 v/v/hr and the hydrogen and carbon monoxide a GHSV of 50 to 10,000 v/v/hr.

6. A process as claimed in claim 1 wherein the oxygen content of the carbon monoxide and hydrogen feed is maintained below 300 p.p.m.

7. A process as claimed in claim 1 wherein said metal nucleus is rhodium.

* * * * *